United States Patent [19]

Williams et al.

[11] Patent Number: 5,070,265

[45] Date of Patent: Dec. 3, 1991

[54] COMPRESSED SPACER FOR PERMANENT RETENTION OF ELECTRICAL MOTOR TERMINALS

[75] Inventors: Ronald D. Williams, St. Charles County; William D. Crow, St. Louis County, both of Mo.

[73] Assignee: Emerson Electric Co., St. Louis County, Mo.

[21] Appl. No.: 601,529

[22] Filed: Oct. 23, 1990

[51] Int. Cl.⁵ .............................................. H02R 4/20
[52] U.S. Cl. ..................................... 310/71; 403/194; 439/433; 439/571
[58] Field of Search ................. 310/71, 68 R, 68 D; 403/194, 359; 439/78, 84, 433, 434, 560, 571, 573, 387, 522, 733, 849, 850

[56] References Cited

U.S. PATENT DOCUMENTS 4,683,390  7/1987  Imori et al. ........................... 310/71
4,745,530  5/1988  Farrell, Jr. et al. ................. 439/571

*Primary Examiner*—Steven L. Stephan
*Assistant Examiner*—D. L. Rebsch
*Attorney, Agent, or Firm*—Polster, Polster and Lucchesi

[57] ABSTRACT

A dynamoelectric machine (M) has a terminal board (T) on which electrical connections are made by attaching various electrical elements (1, 5) together so, that an electrical connection is made between them. A fastener 13 is used to physically make the attachment. A spacer (25) fits on and is compressed about the fastener to permanently attach the elements and insure that electrical integrity between them is maintained. The elements cannot be subsequently loosened by connection and disconnection of other elements to the board, or by an element rotating relative to the fastener.

5 Claims, 1 Drawing Sheet

COMPRESSED SPACER FOR PERMANENT RETENTION OF ELECTRICAL MOTOR TERMINALS

BACKGROUND OF THE INVENTION

This invention relates to a spacer, and in particular, to a spacer used with switches on dynamoelectric machines.

Dynamoelectric machines such as electric motors usually have a terminal board to which are secured electrical terminals. One method of securing the terminal to the board is to press a fastener such as a stud through corresponding openings in the terminal and the board. It is important that the electrical integrity of the resultant connection be maintained once it is made. Oft-times, however, movement of the motor, vibrations, people attaching or unattaching parts to the motor, may inadvertently cause the connection to be loosened, either by the terminal being partially pulled off the stud or by being turned about the stud. When the former happens, the terminal may be knocked off or fall off the stud, resulting in an open circuit and an inoperative motor. When the latter happens, the junction between the terminal and the electrical wire to which it is attached is stressed, which may ultimately cause the connection to fail, again resulting in an inoperative motor. It would be helpful to be able to permanently clamp the terminal, stud, and board together in such a way as to prevent the above occurrences.

SUMMARY OF THE INVENTION

It is an object of the present invention to provide a low cost, easy-to-use spacer for use on the terminal board of a dynamoelectric machine such as an electric motor.

Another object of the invention is to provide such a spacer which can be pressed on a fastener such as a stud after the fastener has been installed on the board, to attach, for example, a wire terminal, or a switch arm to the board.

Yet another object of the invention is to provide such a spacer which can be pressed on the knurled outer surface of a stud or similar fastener with sufficient compressive force to insure a good, permanent electrical connection between those elements attached to the stud and that the terminal is not inadvertently loosened.

A further object of the invention is to provide such a spacer which prevents rotation of a terminal about the stud so that undue stresses are not placed on the wire to which the terminal is connected.

In accordance with this invention, generally stated, a dynamoelectric machine has a terminal board on which electrical connections are made by attaching various electrical elements together. A fastener is used to physically make this attachment. A spacer is used to attach the elements permanently, to insure that the electrical integrity between the elements is maintained and that they do not become loosened by connection and disconnection of other elements to the board, or by an element's being rotated relative to the fastener. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
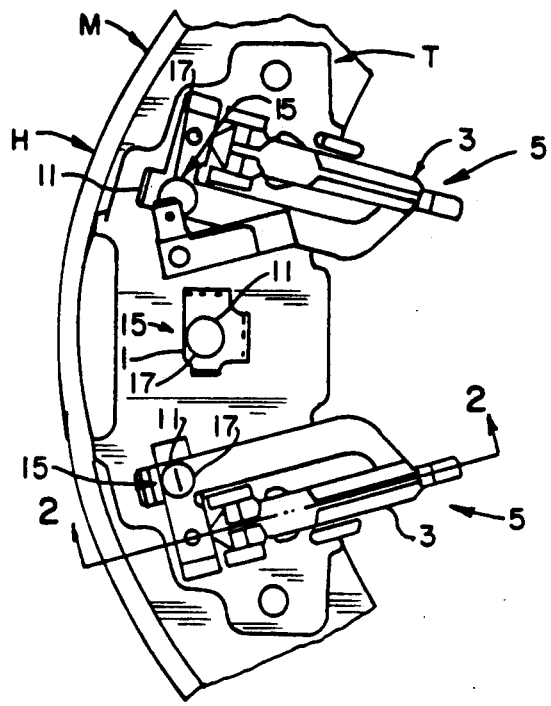
FIG. 1 is a plan view of a terminal board for a dynamoelectric machine such as an electric motor.
Figure 2:
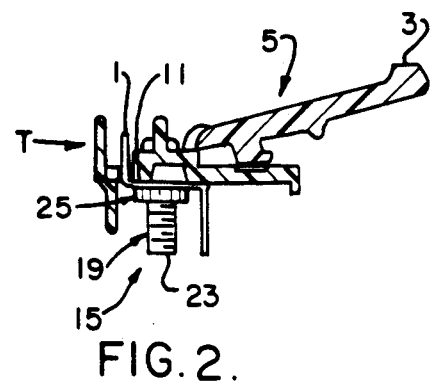
FIG. 2 is a sectional view taken along line 2—2 in FIG. 1.

Referring to the drawings, a dynamoelectric machine M which is, for example, an electric motor, has a terminal board T conveniently located on a portion of its housing H. The terminal board, which forms no part of this invention, is shown in simplified form in the drawings for sake of clarity. The terminal board is provided for making various electrical connections to the motor. This is done by attaching or connecting various electrical elements together so that an electrical connection is made between them. Such electrical elements may include, for example, electrical terminals 1, and the switch arms 3 of electrical switches 5. The shape of these various components will not be described in detail except to note that each includes an opening (opening 7 in the terminal and opening 9 in the switch arm). These openings are of the same diameter as an opening 11 (see FIG. 3) in the terminal board. It will be understood that a number of such openings may be formed in the terminal board although only three are indicated in FIG. 1.

Figure 3:
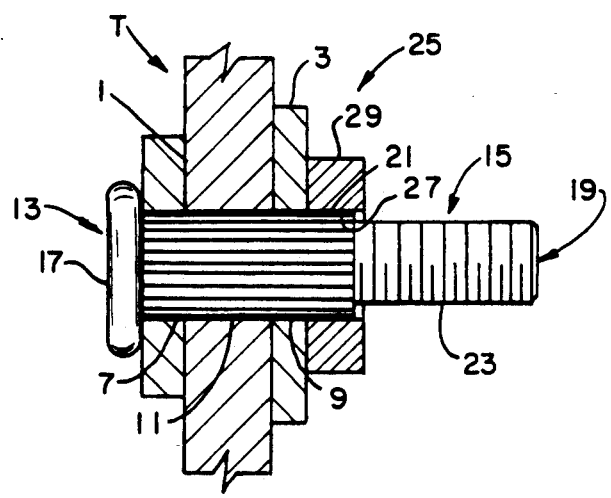
FIG. 3 is a sectional view of a fastener assembly with the spacer of the present invention installed.

A fastener 13 is used to physically make the attachment of the various elements to the terminal board. As shown in FIG. 3, the electrical elements are positionable on either side of the terminal board adjacent an opening 11. Fastener 13 comprises a stud 15 having a head 17 larger than opening 11. The stud further has a shank 19 sized to fit through the opening. The shank may have a first section 21 adjacent the head which is knurled, and a second section 23 which is threaded. In practice, the electrical elements to be interconnected are positioned on either side of a terminal board opening, with the openings in the elements aligned with an opening in the board. The shank portion of a stud 15 is then inserted through the opening and a nut (not shown) threaded onto the threaded end of the shank. The electrical elements are all then commonly connected through the stud. Usually this procedure is carried out at the factory during fabrication of the motor.

In the past, it has been found that the end user of the motor may inadvertently loosen the connections, or they may be loosened by vibrations, the jostling which occurs if the motor is moved about, etc. As a result of this loosening, the nut might fall off allowing the stud to drop out or one of the electrical elements to disengage itself from the fastener. Any of these occurrences will result in an inoperative motor. Sometimes, one of the elements may be turned relative to the fastener, putting a strain on the connection between the terminal or switch arm and the electrical wire to which it is attached. If the connection subsequently fails, the result is again an inoperative motor.

Figure 4:
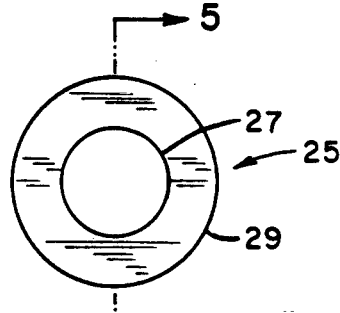
FIG. 4 is an elevational view of the spacer.
Figure 5:
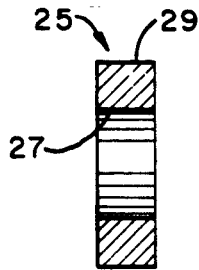
FIG. 5 is a sectional view of the spacer taken along line 5—5 in FIG. 4.

To prevent this from happening, and to insure that the electrical integrity between the elements is maintained, a spacer 25 is provided which fits over the shank of the stud, after the stud is inserted through the opening in the terminal board and the electrical elements are positioned on the shank. As shown in FIGS. 4 and 5, the spacer is similar in appearance to a washer in that it has a central opening 27 the diameter of which corresponds to that of the knurled portion of the shank. The spacer has an outer diameter which is greater than the diameter of stud head 17 but less than the electrical elements over which it fits when installed on the shank. The spacer has a smooth outer sidewall 29, the height of which allows the spacer to conveniently fit over knurled section 21 of the shank without covering an extensive portion of the threaded section 23 thereof.

The spacer is compressible about the shank after it is installed on the fastener. Any convenient tool may be used to do this. When compressed, the spacer exerts a sufficient compressive force on the shank that the electrical elements attached to it cannot be subsequently loosened from it or turned about it. Further, the smooth outer surface of the spacer prevents it from being gripped by tools and turned. Consequently, the elements are permanently attached to the fastener and the end user of the motor cannot dislodge the electrical elements from the spacer. Further, he cannot turn the elements, which could cause a break away of the wire attached.

Numerous variations, within the scope of the appended claims, will be apparent to those skilled in the art in light of the foregoing description and the accompanying drawings.

Having thus described the invention, what is claimed and desired to be secured by Letters Patent is:

1. In a dynamoelectric machine having a terminal board, at least one opening in said terminal board, a fastener insertable through said opening, and at least one electrical element mounted to said fastener, said fastener including a head portion and a shank portion, at least one electrical element being positioned on said shank portion, the improvement comprising means for physically attaching the stud and electrical element to said board, said attaching means comprising a spacer fitter over the shank of said stud and compressible over the shank with sufficient force that the fastener cannot subsequently loosen from the terminal board.

2. In a dynamoelectric machine having a terminal board on which electrical connections are made by attaching various electrical elements together so that an electrical connection is made between them, the terminal board having at least one opening therethrough with the electrical element being positionable on either side of the opening, the fastener being used to make the physical attachment, the fastener including a stud having a head larger than the opening and a shank sized to fit through the opening, at least one of the electrical elements being fitted about the stud, the improvement comprising means for permanently attaching the electrical element to the stud to ensure that the electrical integrity is maintained between them so that the elements do not become loosened by connection and disconnection of other elements to the board, or by an element rotating relative to the fastener, said attaching means including a spacer which fits over the shank of the stud, the attaching means being compressible about the shank with sufficient force that any element attached to the shank cannot subsequently be loosened or turned about the stud.

3. The improvement of claim 2 wherein the shank has a knurled outer surface over which the spacer fits, the spacer having a smooth outer surface which prevents tools from gripping the spacer and turning it.

4. A spacer for use in a dynamoelectric machine having a terminal board on which electrical connections are made by attaching various electrical elements together so that an electrical connection is made between them, the terminal board having an opening therethrough with electrical elements being positionable on either side of the opening, a fastener being used to physically attach the elements, the fastener comprising a stud having a head larger than the opening and a shank sized to fit through the opening for an electrical elements to be fitted about the stud, the spacer permanently attaching the elements to the stud to insure that the electrical integrity between them is maintained and that the elements do not become loosened by connection and disconnection of other elements to the board, or by an element rotating relative to the fastener, the spacer fitting over the shank of the stud and being compressible thereabout, the spacer being compressed with sufficient force that the elements attached to the shank cannot be subsequently loosened from or turned about the stud.

5. The improvement of claim 4 wherein the shank has a knurled outer surface and the spacer has a smooth outer surface thus to prevent tools from gripping the spacer and turning it.

* * * * *